(12) United States Patent
Shimomukai et al.

(10) Patent No.: US 10,812,684 B2
(45) Date of Patent: Oct. 20, 2020

(54) COLOR CONVERSION TABLE CREATION BY ADJUSTING OUTPUT VALUE OF SPECIFIC GRID POINT IN REFERENCE COLOR CONVERSION TABLE AND CALCULATING PROROGATION TO PERIPHERAL GRID POINT

(71) Applicant: SEIKO EPSON CORPORATION, Tokyo (JP)

(72) Inventors: Takumi Shimomukai, Nagano (JP); Mitsuhiro Yamashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/720,101

(22) Filed: Dec. 19, 2019

(65) Prior Publication Data
US 2020/0204707 A1   Jun. 25, 2020

(30) Foreign Application Priority Data
Dec. 21, 2018   (JP) ................................. 2018-239246

(51) Int. Cl.
*H04N 1/60*   (2006.01)

(52) U.S. Cl.
CPC ......... *H04N 1/6019* (2013.01); *H04N 1/6005* (2013.01); *H04N 1/6033* (2013.01)

(58) Field of Classification Search
CPC .......................... H04N 1/56; H04N 1/60–6097
See application file for complete search history.

(56) References Cited

U.S. PATENT DOCUMENTS

| 7,345,787 B2 * | 3/2008 | Ito ........................ | H04N 1/6058 345/589 |
| 7,369,272 B2 * | 5/2008 | Ito ........................ | H04N 1/6016 358/1.9 |
| 7,450,267 B2 * | 11/2008 | Ito ........................ | H04N 1/6058 345/600 |
| 2003/0081831 A1 * | 5/2003 | Fukao ................... | H04N 1/6025 382/167 |

(Continued)

FOREIGN PATENT DOCUMENTS

| JP | 2003-298862 A | 10/2003 |
| JP | 2008-028679 A | 2/2008 |

(Continued)

*Primary Examiner* — Scott A Rogers
(74) *Attorney, Agent, or Firm* — Global IP Counselors, LLP

(57) ABSTRACT

A color conversion table creation method includes creating a reference color conversion table using a color value of a color chart, and adjusting a color conversion table by adjusting an output value of a specific grid point corresponding to a predetermined input value in the created reference color conversion table, in which the adjusting the color conversion table includes an adjustment amount calculation step of calculating an adjustment amount of the output value of the specific grid point, a ripple amount determination step of determining a ripple amount when the calculated adjustment amount propagates with respect to a peripheral grid point existing in a vicinity of the specific grid point, and an application step of applying the determined ripple amount to the peripheral grid point in the color conversion table.

10 Claims, 9 Drawing Sheets

(56) References Cited

U.S. PATENT DOCUMENTS

| | | | |
|---|---|---|---|
| 2007/0030505 A1* | 2/2007 | Ito | H04N 1/6033 |
| | | | 358/1.9 |
| 2007/0195342 A1* | 8/2007 | Sugiura | H04N 1/64 |
| | | | 358/1.9 |
| 2008/0018962 A1 | 1/2008 | Kawai | |
| 2011/0299101 A1 | 12/2011 | Namikata | |
| 2017/0280023 A1* | 9/2017 | Kobayashi | G06K 15/1878 |
| 2020/0244839 A1* | 7/2020 | Hiramoto | H04N 1/6008 |

FOREIGN PATENT DOCUMENTS

| | | |
|---|---|---|
| JP | 2011-254316 A | 12/2011 |
| JP | 2012-060397 A | 3/2012 |

* cited by examiner

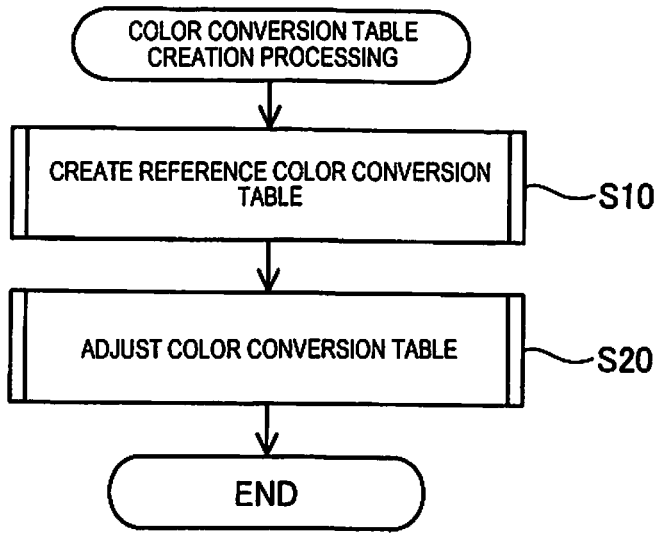
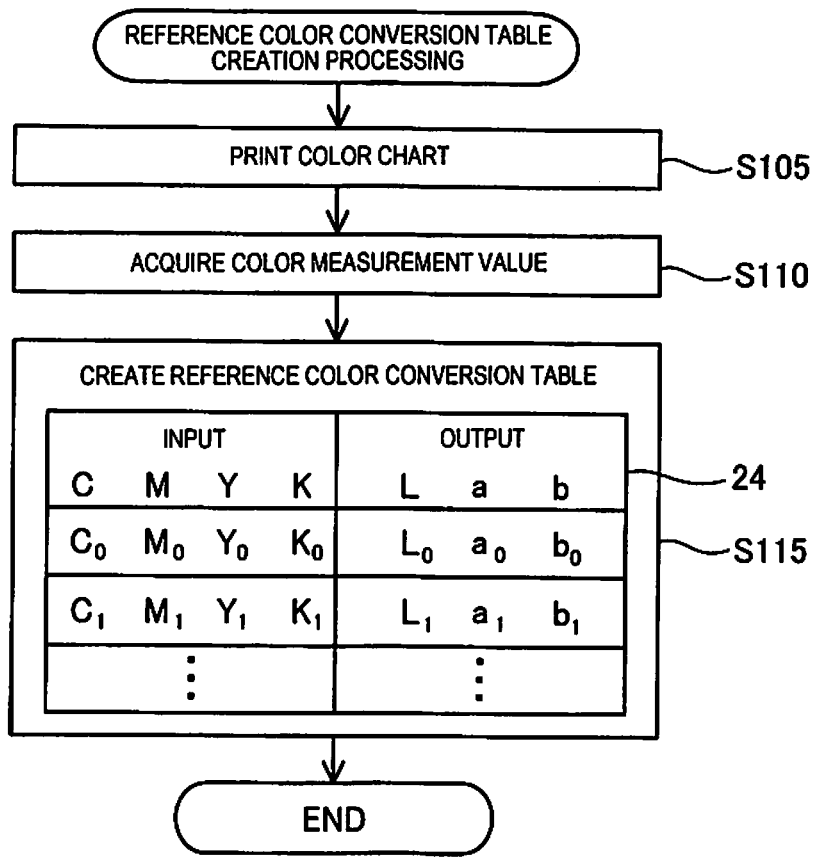

● GRID POINT WHERE ADJUSTMENT AMOUNT IS DETERMINED IN STEP S215
○ GRID POINT WHERE ADJUSTMENT AMOUNT IS DETERMINED IN STEP S305
△ GRID POINT WHERE ADJUSTMENT AMOUNT IS DETERMINED IN STEP S310 (VERTICE)
▼ GRID POINT WHERE ADJUSTMENT AMOUNT IS DETERMINED IN STEP S310 (RIDGE LINE)
☐ GRID POINT WHERE ADJUSTMENT AMOUNT IS DETERMINED IN STEP S315 (FRONT SURFACE)

COLOR CONVERSION TABLE CREATION BY ADJUSTING OUTPUT VALUE OF SPECIFIC GRID POINT IN REFERENCE COLOR CONVERSION TABLE AND CALCULATING PROROGATION TO PERIPHERAL GRID POINT

The present application is based on, and claims priority from JP Application Serial Number 2018-239246, filed Dec. 21, 2018, the disclosure of which is hereby incorporated by reference herein in its entirety.

BACKGROUND

1. Technical Field

The present disclosure relates to a color conversion table creation method and a color conversion table creation apparatus.

2. Related Art

In the related art, in order to obtain an appropriate printed matter according to individual printer characteristics, print medium characteristics, ink coloring characteristics, and the like, a color conversion table such as an input profile for converting from a device-dependent color system to a device-independent color system, and an output profile for converting from a device-independent color system to a device-dependent color system is used. The color conversion table is created by printing a color chart having a number of color patches in which colors are defined in advance with a printer, measuring the color of the printed color chart with a color measurement device, and generating a correspondence relationship between the device-dependent color system and the device-independent color system based on the measured color information. The color conversion table may be adjusted after it is created in order to cope with individual differences in print results for each printer. For example, JP-A-2011-254316 proposes a technique for improving the accuracy of a color conversion table by making the color measurement conditions consistent when creating and adjusting the color conversion table.

However, for example, when the number of colors in an output color system is greater than the number of colors in an input color system, an output value with respect to an input value may not be uniquely determined depending on a combination of the input color system and the output color system. In this case, the accuracy of the color conversion table decreases depending on a method of determining the correspondence relationship between the input color system and the output color system. When color conversion is performed using such a color conversion table and the color-converted image data is printed, the accuracy of color reproducibility is lowered, and the print result desired by a user may not be obtained. Such a problem is not limited to a case of adjusting the color conversion table as in the technique described in JP-A-2011-254316, and is common in a case of creating the color conversion table.

SUMMARY

According to an aspect of the present disclosure, there is provided a color conversion table creation method. The color conversion table creation method includes creating a reference color conversion table using a color value of a color chart, and adjusting a color conversion table by adjusting an output value of a specific grid point corresponding to a predetermined input value in the created reference color conversion table, in which the adjusting the color conversion table includes an adjustment amount calculation step of calculating an adjustment amount of the output value of the specific grid point, a ripple amount determination step of determining a ripple amount when the calculated adjustment amount propagates with respect to a peripheral grid point existing in a vicinity of the specific grid point, and an application step of applying the determined ripple amount to the peripheral grid point in the color conversion table.

BRIEF DESCRIPTION OF THE DRAWINGS

FIG. 2 is a flowchart illustrating a processing procedure of color conversion table creation processing.

FIG. 3 is a flowchart illustrating a processing procedure of reference color conversion table creation processing.

DESCRIPTION OF EXEMPLARY EMBODIMENTS

A. Embodiment

A1. System Configuration

Figure 1:
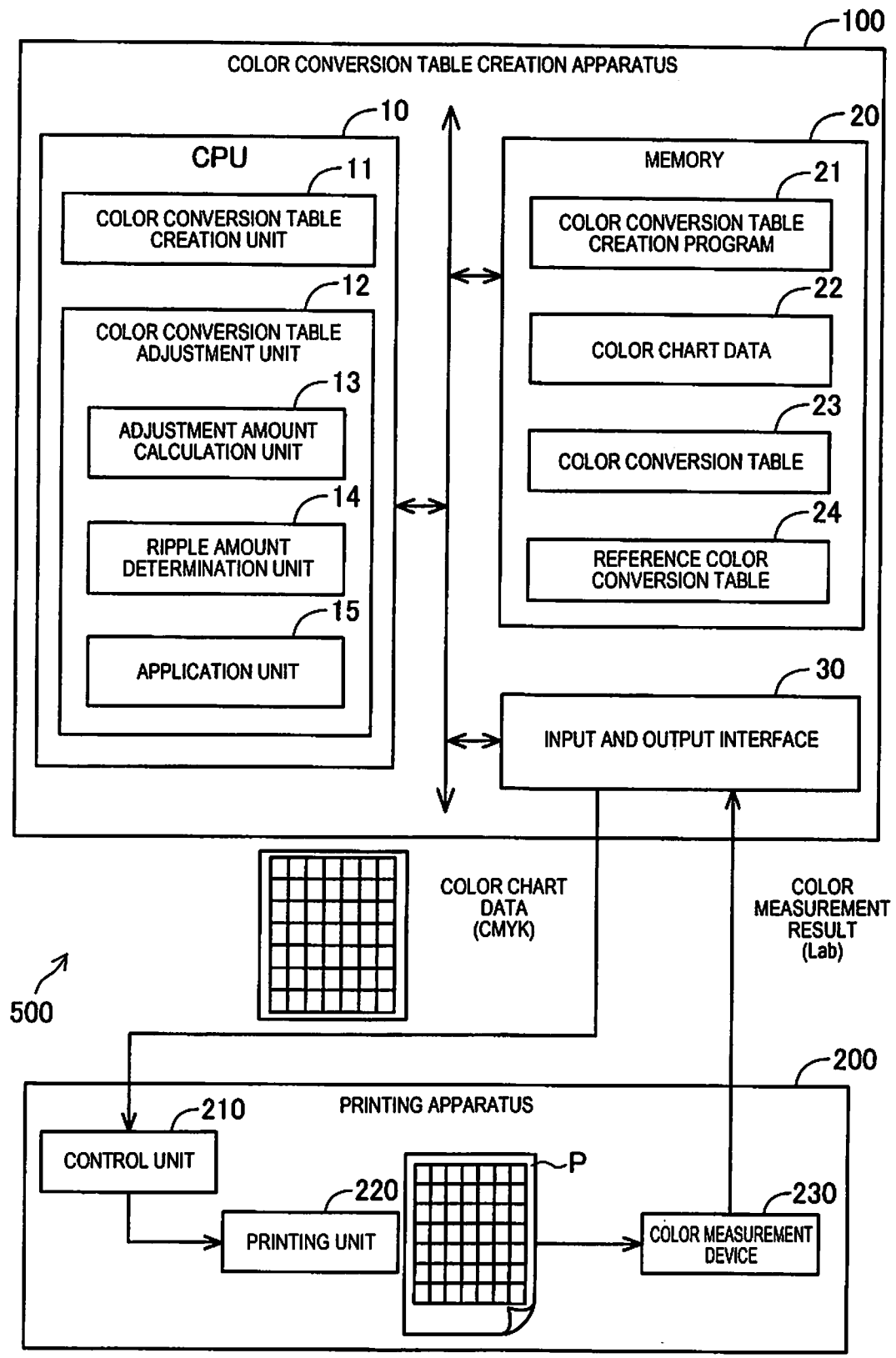
FIG. 1 is a block diagram illustrating a schematic configuration of a color conversion table creation system.

FIG. 1 is a block diagram illustrating a schematic configuration of a color conversion table creation system 500. The color conversion table creation system 500 is provided with a color conversion table creation apparatus 100 and a printing apparatus 200 as an embodiment of the present disclosure.

The color conversion table creation apparatus 100 creates and adjusts a color conversion table in which an input value of a device-dependent color system is associated with an output value of a device-independent color system. In the present embodiment, a CMYK color system is used as a device-dependent color system, and a CIE-Lab color system is used as a device-independent color system. In the present embodiment, a color conversion table 23 is used in another printing apparatus different from the printing apparatus 200 to convert input image data to be printed into image data expressed by a color value independent of the printing apparatus.

The color conversion table creation apparatus 100 is a computer provided with a CPU 10, a memory 20, and an input and output interface 30. The CPU 10, the memory 20, and the input and output interface 30 are coupled via an internal bus so as to be capable of bidirectional communication. The CPU 10 functions as a color conversion table creation unit 11 and a color conversion table adjustment unit 12 by executing a control program stored in the memory 20 in advance.

The color conversion table creation unit 11 creates a reference color conversion table 24 as a reference color conversion table when adjusting the color conversion table 23 using the color measurement result of a color chart described later.

The color conversion table adjustment unit 12 adjusts an output value corresponding to a predetermined input value in the created reference color conversion table 24 to adjust an output value of the color conversion table 23. The color conversion table adjustment unit 12 is provided with an adjustment amount calculation unit 13, a ripple amount determination unit 14, and an application unit 15.

When the created reference color conversion table 24 is represented as a color space of the CMYK color system, the adjustment amount calculation unit 13 calculates an adjustment amount of an output value of a specific grid point in the color space. Detailed descriptions of the color space of the CMYK color system, the specific grid point, and the adjustment amount will be described later. In the following description, the specific grid point is referred to as a "specific grid point".

The ripple amount determination unit 14 determines the adjustment amount of the output values of the grid points existing around the specific grid point in the color space described above. In the following description, the grid points existing around the specific grid point are referred to as a "peripheral grid point". In addition, the adjustment amount of the output value of the peripheral grid point is referred to as a "ripple amount". In the present embodiment, the adjustment amount of the specific grid point is distributed to all grid points in the color space. A detailed description of the ripple amount will be described later.

The application unit 15 applies the ripple amount calculated by the ripple amount determination unit 14 to the color conversion table 23.

In the present embodiment, the color conversion table adjustment unit 12 repeatedly performs adjustment amount calculation, ripple amount calculation, and ripple amount application until a predetermined condition is satisfied. As a result, each grid point of the color conversion table 23 is associated with a target output value or an output value close to the target output value, and the accuracy of the color conversion table 23 is improved.

The memory 20 includes a ROM, a RAM, and an EEPROM. The memory 20 stores in advance a color conversion table creation program 21, color chart data 22, and a color conversion table 23, in addition to a control program that realizes the functions of the above-described functional units. The color conversion table creation program 21 is a computer program that creates and adjusts the color conversion table. When the color conversion table creation program 21 is executed, color conversion table creation processing described later is executed to print a color chart, color measurement of the printed color chart, creation of the reference color conversion table 24 based on the color measurement result, and adjustment of the color conversion table 23 based on the reference color conversion table 24 are performed.

The color chart data 22 is image data of a color chart expressed by a color value of the CMYK color system. The color chart is provided with a plurality of colors (color patches) expressed by a combination of values of from 0 to 255 or from 0 to 100 for each color of cyan, magenta, yellow, and black.

The input and output interface 30 transmits the color chart data 22 to the printing apparatus 200 and receives a color measurement result from the printing apparatus 200.

The printing apparatus 200 is an ink jet printer that ejects ink of four colors of cyan, magenta, yellow, and black. The printing apparatus 200 ejects the ink onto a print medium P to form dots on the print medium P and print an image or the like. The printing apparatus 200 is provided with a control unit 210, a printing unit 220, and a color measurement device 230.

The control unit 210 is configured to include a microcomputer provided with a CPU and a memory, and performs overall control of the printing apparatus 200. When the control unit 210 receives the color chart data 22 from the color conversion table creation apparatus 100, the control unit 210 controls the formation of the print image of the color chart on the print medium P by the printing unit 220.

The printing unit 220 is provided with a print head, and ejects ink droplets onto the print medium P in accordance with a control signal from the control unit 210 to print an image or the like.

The color measurement device 230 measures the color of the printed material created by the printing unit 220 and the printed material created by another printing apparatus. The color measurement result is expressed by a color value in a device-independent color space (for example, Lab). In the present embodiment, the color measurement device 230 measures the spectral reflectance of the dot group formed on the print medium P, and converts each measured spectral reflectance into an L* value, an a* value, and a b* value using a color matching function. Instead of the CIE-Lab color system, the color measurement result may be expressed by a color value of any other device-independent color system such as XYZ and CIE-Luv.

A2. Overall Flow of Color Conversion Table Creation Processing

FIG. 2 is a flowchart illustrating a processing procedure of color conversion table creation processing. First, the overall flow of the color conversion table creation processing will be described. The color conversion table creation processing illustrated in FIG. 2 is started when an instruction to start the color conversion table creation processing is input to the color conversion table creation apparatus 100. In Step S10, the color conversion table creation unit 11 creates the reference color conversion table 24 using the color measurement result of the color chart described above. Next, in Step S20, the color conversion table adjustment unit 12 adjusts the output value of the color conversion table 23 by adjusting the output value of the reference color conversion table 24 created in Step S10. Hereinafter, details of each step will be described.

A3. Reference Color Conversion Table Creation Processing

FIG. 3 is a flowchart illustrating a processing procedure of reference color conversion table creation processing. In Step S105, the color conversion table creation unit 11 causes the printing apparatus 200 to print a color chart. Specifically, the color conversion table creation unit 11 transmits the color chart data 22 to the printing apparatus 200 via the input and output interface 30, and the printing apparatus 200 forms a print image of the color chart on the print medium P.

Next, in Step S110, the color conversion table creation unit 11 acquires a color measurement value of the color chart. Specifically, the color measurement device 230 measures the color value of the print image of the color chart formed on the print medium P, and transmits the color measurement result to the color conversion table creation apparatus 100 via the input and output interface 30.

Next, in Step S115, the color conversion table creation unit 11 creates a color conversion table (reference color conversion table 24) using the color (CMYK value) of each color patch of the color chart as an input value, corresponding to the color of each color patch, and using each color measurement value (Lab value) obtained in Step S110 described above as an output value. The color conversion table may be a correspondence relationship between RGB values and Lab values, or a correspondence relationship between CMYK values and XYZ values, in addition to the correspondence relationship between CMYK values and Lab values. In addition, an ICC profile includes an A2B table and a B2A table for each of the input profile and the output profile. In the present embodiment, an example of a correspondence relationship between CMYK values and Lab values will be described.

A4. Color Conversion Table Adjustment Processing

Prior to a detailed description of color conversion table adjustment processing, the color space and the grid point will be described.

Figure 4:
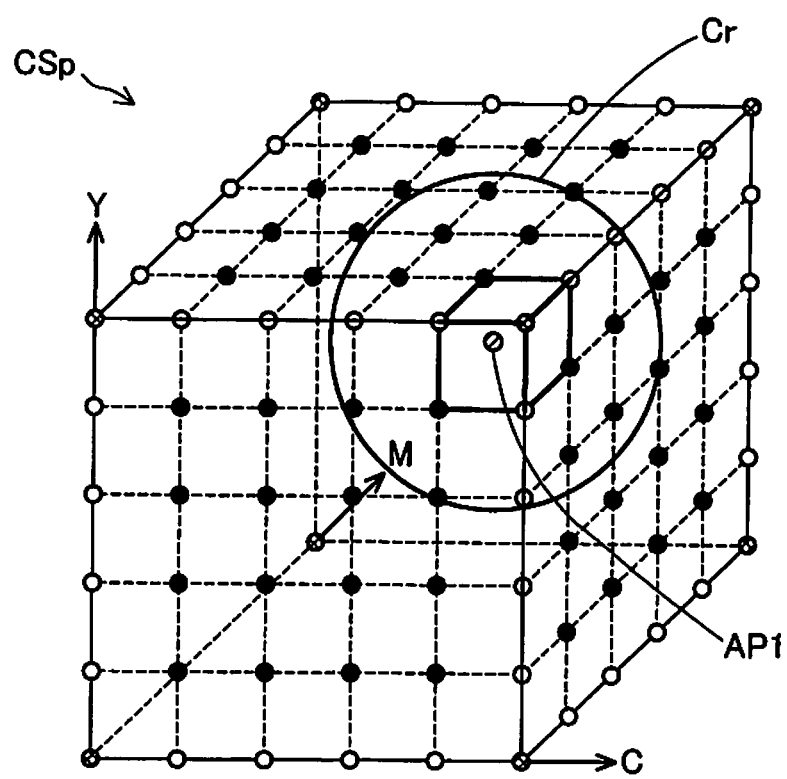
FIG. 4 is an explanatory diagram schematically illustrating an input color system color space of a reference color conversion table.

FIG. 4 is an explanatory diagram schematically illustrating an input color system color space CSp of the reference color conversion table 24. FIG. 4 illustrates a color space of the CMYK color system when K=0 for convenience of understanding. As illustrated in FIG. 4, when the input color system color space CSp is represented as a cube, the input grid points of the reference color conversion table 24 are represented as a plurality of vertices of small cubes obtained by dividing a cube representing the input color system color space CSp. In FIG. 4, in order to clearly illustrate the grid points, the grid points on an M-Y plane of C=0, a C-Y plane of M=0, and a C-Y plane of Y=255 are illustrated, and the illustration of other grid points is omitted.

In this embodiment, "grid point" means a virtual point arranged in the CMYK color system color space, and an output coordinate value corresponding to the position of the grid point is stored in the grid point. For example, when each color from 0 to 255 in the input color system color space CSp is divided into 16 equal parts and the number of grids is 17, the number of grid points is $17^4$-$2^4$. In FIG. 4, the grid points corresponding to "vertices" are indicated by hatched circles, the grid points corresponding to "ridge lines" are indicated by white circles, and the grid points corresponding to "surfaces" are indicated by black circles.

As illustrated in FIG. 4, the grid points corresponding to the "ridge lines" mean grid points in which any one of cyan, magenta, yellow, and black is 0 or 255, and grid points excluding the vertices, among the grid points of the input color system color space CSp. The grid points corresponding to "surfaces" mean grid points in which any two colors of cyan, magenta, yellow, and black are 0 or 255, and grid points excluding the ridge lines, among the grid points of the surface of the input color system color space CSp. The grid points corresponding to "cube" are all grid points except the grid points on the outer surface of the input color system color space CSp, that is, grid points inside the cube.

Here, the color of the color chart is represented as one point in the input color system color space CSp and exists in one of the grids illustrated in FIG. 4. In FIG. 4, a point AP1 is illustrated as a point corresponding to a certain color in the color chart. As illustrated in FIG. 4, the color of the color chart does not normally correspond to the grid points of the input color system color space CSp. Therefore, for a color that does not correspond to a grid point, such as the point AP1, the output value of the grid point adjacent to the point AP1 is interpolated and the obtained color value is associated with the grid point. In the present embodiment, when adjusting the output value of a grid point adjacent to the point AP1, the adjustment amount of the grid point is set to an adjustment amount according to a distance between the point AP1 and the grid point. Specifically, the adjustment amount of each grid point is determined such that the adjustment amount decreases as the distance from the point AP1 to each grid point increases.

In addition, when the adjustment amounts of the grid points adjacent to the point AP1 are propagated to the entire input color system color space CSp, the adjustment amount to be propagated to each of the grid points is an adjustment amount according to the distance from the point AP1. For example, when it is considered that the adjustment amount is propagated to each of the grid points in a sphere Cr centered on the point AP1 illustrated in FIG. 4, the adjustment amount of the grid point in the vicinity of the center of the sphere Cr is large, and the adjustment amount of the grid points in the vicinity of the outer periphery of the sphere Cr is small. Hereinafter, a method of calculating the adjustment amount and a method of propagating the adjustment amount will be described in detail. In the following description, a point corresponding to a color of the color chart in the input color system color space CSp is referred to as an "adjustment point".

Figure 5:
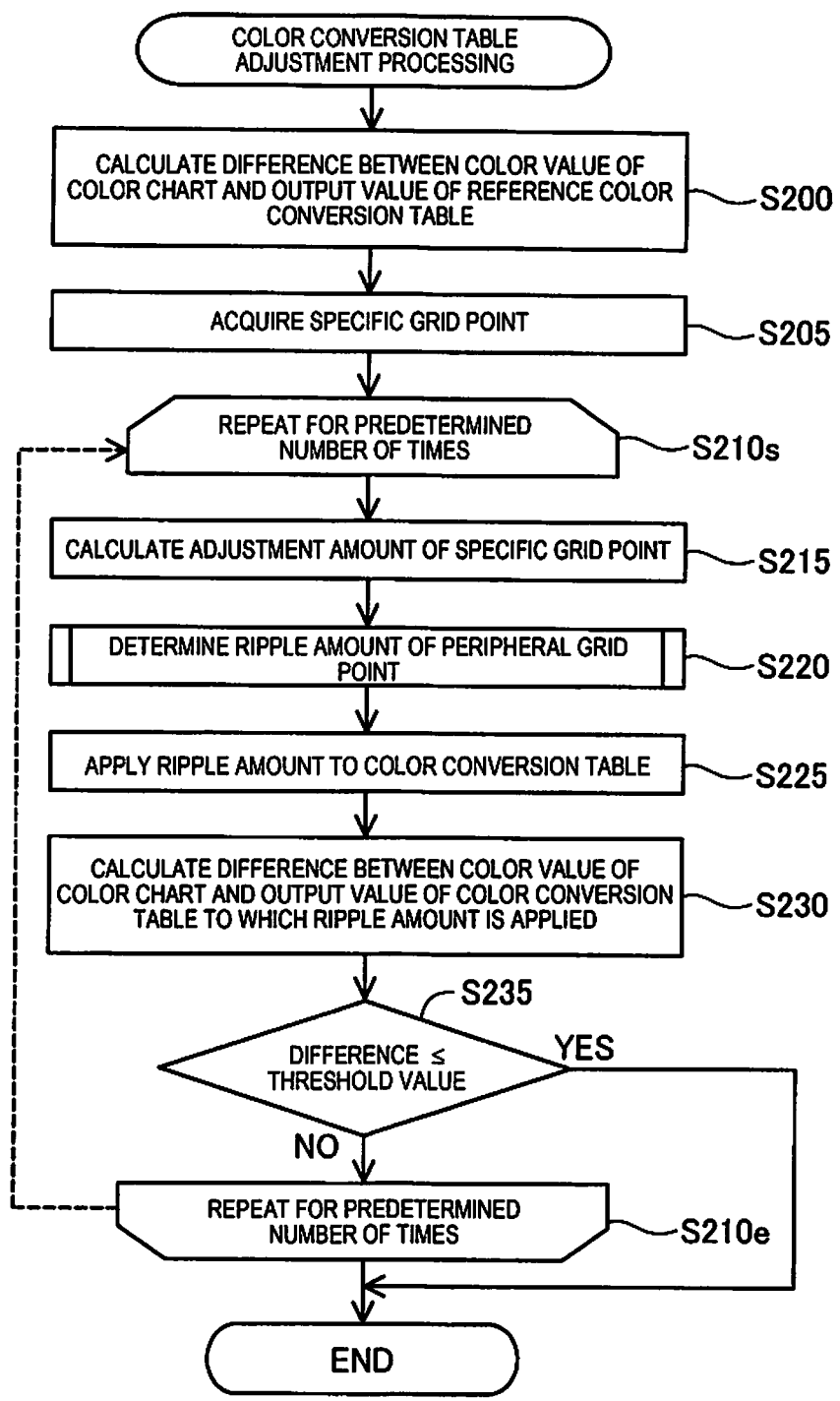
FIG. 5 is a flowchart illustrating a processing procedure of color conversion table adjustment processing.

FIG. 5 is a flowchart illustrating a processing procedure of the color conversion table adjustment processing. As illustrated in FIG. 5, in Step S200, the color conversion table adjustment unit 12 calculates a difference between the color value of the color chart and the output value of the reference color conversion table 24. Specifically, first, the color conversion table adjustment unit 12 acquires the color measurement value of the color patch from the color measurement result of the color chart. Next, the color conversion table adjustment unit 12 reads a color value (Lab value) that is an output value corresponding to the color of the color patch, by comparing the color of the color patch (CMYK value) with the reference color conversion table 24. The color conversion table adjustment unit 12 calculates a difference of each of acquired color values. In the following description, the difference calculated in Step S200 is expressed as Δ Lab.

In Step S205, the color conversion table adjustment unit 12 acquires a specific grid point. The "specific grid point" means a grid point surrounding an adjustment point that is a point corresponding to the color of the color patch in the input color system color space CSp.

Figure 6:
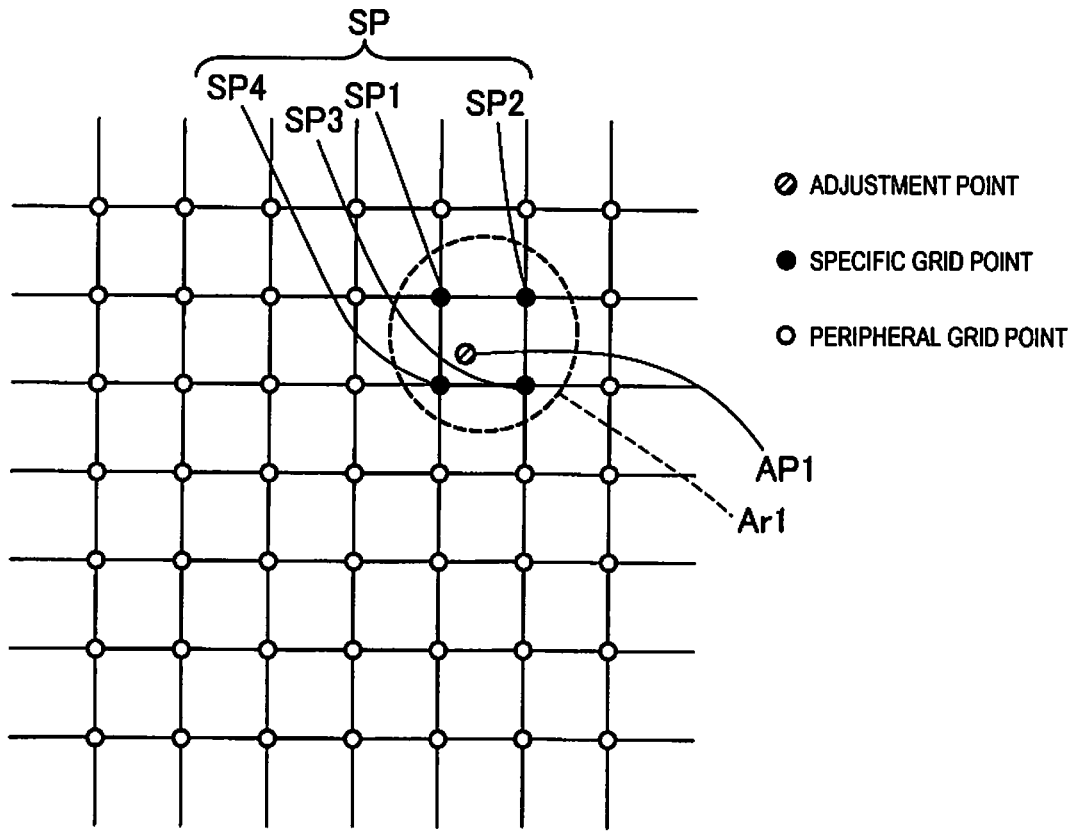
FIG. 6 is an explanatory diagram schematically illustrating specific grid points in the input color system color space.

FIG. 6 is an explanatory diagram schematically illustrating specific grid points in the input color system color space CSp. In FIG. 6, for convenience of illustration, the input color system color space CSp is illustrated in two dimensions. As illustrated in FIG. 6, specific grid points SP are four grid points SP1, SP2, SP3, and SP4 arranged in the closest vicinity of the adjustment point AP1 among the plurality of grid points surrounding the adjustment point AP1. In the present embodiment, "grid points arranged in the closest vicinity" does not mean the single point closest to the adjustment point AP1, and means a set (grid point group) of a plurality of grid points surrounding the adjustment point AP1 with the minimum area or the minimum volume. The specific grid points SP1 to SP4 correspond to the vertices of a small cube in the input color system color space CSp. In this embodiment, since the four-dimensional CMYK color system is used as the input color system, the number of specific grid points SP is actually 16 points. When the CMY color system or the RGB color system is used as the device-dependent color system, the number of specific grid points SP is 8. The peripheral grid points illustrated in FIG. 6 are grid points on the reference color conversion table 24 excluding the specific grid points SP.

In the above-described Step S205 illustrated in FIG. 5, the color conversion table adjustment unit 12 acquires a coordinate value of the adjustment point AP1 in the input color system color space CSp using a known 1D Curve technique, and acquires the position of the specific grid point SP based on the coordinate value.

Next, in Steps S210s to S210e, the color conversion table adjustment unit 12 repeatedly executes Steps S215 to S235 for a predetermined number of times. In the present embodiment, the "predetermined number of times" means five times. The predetermined number of times may be other number of times of at least one or more instead of five.

In Step S215, the adjustment amount calculation unit 13 calculates the adjustment amount of the specific grid point SP. Specifically, the adjustment amount calculation unit 13 calculates the adjustment amount of the specific grid point SP using the difference Δ Lab calculated in Step S200 described above. At this time, the adjustment amount calculation unit 13 obtains the distance between the adjustment point AP1 and each of the specific grid points SP1 to SP4, and calculates the adjustment amounts of each of the specific grid points SP1 to SP4 so that the adjustment amount attenuates according to the distance. Hereinafter, a description will be applied with reference to FIG. 7.

Figure 7:
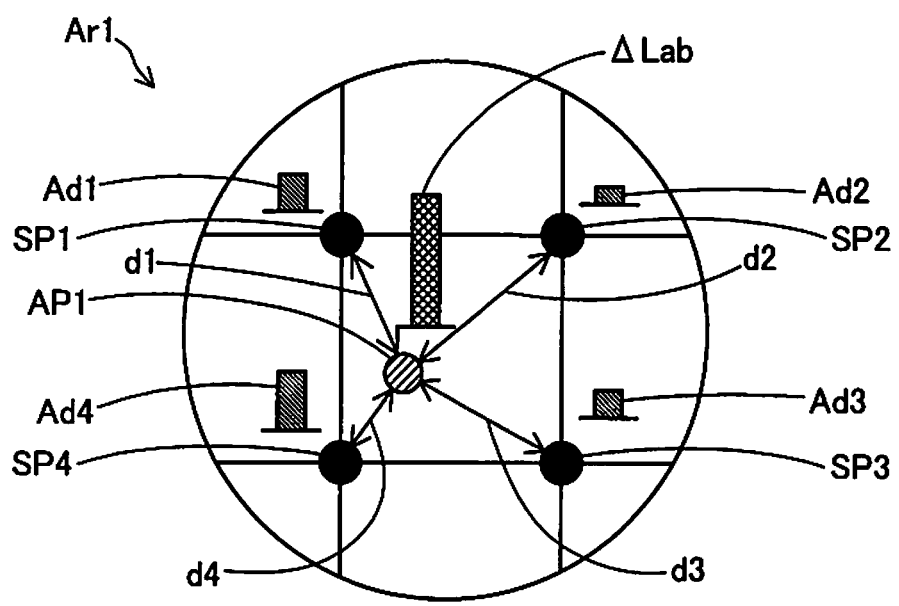
FIG. 7 is an explanatory diagram schematically illustrating an adjustment amount at a specific grid point.

FIG. 7 is an explanatory diagram schematically illustrating the adjustment amount at the specific grid point SP. FIG. 7 illustrates an area Ar1 in FIG. 6 in an enlarged manner, and further illustrates the difference Δ Lab calculated in Step S200 described above and the adjustment amounts Ad1 to Ad4 at the specific grid points SP1 to SP4. As illustrated in FIG. 7, a distance d1 between a first specific grid point SP1 and the adjustment point AP1, a distance d2 between a second specific grid point SP2 and the adjustment point AP1, a distance d3 between a third specific grid point SP3 and the adjustment point AP1, and a distance d4 between a fourth specific grid point SP4 and the adjustment point AP1 increase in the order of distance d4, distance d1, distance d3, and distance d2.

In Step S215 described above, the adjustment amount calculation unit 13 calculates the adjustment amounts Ad1 to Ad4 using the following formula (1).

$$Ad_i = \Delta Lab \times Rate_i \quad (1)$$

In the above formula (1), i=1 to 4. Rate is a function that decreases linearly, for example, so as to be 1.0 at the adjustment point AP1, to gradually decrease the value as the distance from the adjustment point AP1 increases, and to be zero at a distance of a predetermined radius from the adjustment point AP1. The Rate may be uniformly set to be 1.0 so that the adjustment amount $Ad_i$ is equal to Δ Lab regardless of the distance from the adjustment point AP1. In addition, the Rate may be set to be 1/n so that the adjustment amount $Ad_i$ is all the same value, and the total sum of the adjustment amounts $Ad_i$ is Δ Lab. The above-described n is the number of specific grid points, and is 4 in the example illustrated in FIG. 7. The Rate may be a non-linear function.

The above-described "predetermined radius" is calculated in advance by experiment and is determined for each input color system color space CSp. For example, such a radius may be set to a distance including a specific color in the input color system color space CSp, may be set to be considerably larger than the distance between the grid points, or may be set to a distance including all grid points in the input color system color space CSp.

Each of the adjustment amounts Ad1 to Ad4 is calculated by the above formula (1) so that the adjustment amounts are attenuated (inversely proportional) as the distances d1 to d4 from the adjustment point AP1 are larger. In the example illustrated in FIG. 7, these are calculated so that the adjustment amount Ad4 of the fourth specific grid point SP4 closest to the adjustment point AP1 is the largest, the adjustment amount Ad2 of the second specific grid point SP2 farthest from the adjustment point AP1 is the smallest, and so as to decrease in the order of the adjustment amount Ad4 of the fourth specific grid point SP4, the adjustment amount Ad1 of the first specific grid point SP1, the adjustment amount Ad3 of the third specific grid point SP3, and the adjustment amount Ad2 of the second specific grid point SP2. As described above, by determining the adjustment amount of each of the specific grid points SP according to the distance from the adjustment point AP1 to the specific grid point SP, the adjustment amount according to the degree of influence on the adjustment point AP1 can be determined. Each of the adjustment amounts Ad1 to Ad4 may have the same value as each other regardless of the distance. In the following description, each of the adjustment amounts Ad1 to Ad4 may be collectively referred to simply as an adjustment amount Ad.

As illustrated in FIG. 5, in Step S220, the ripple amount determination unit 14 determines the ripple amount of the peripheral grid points. In the present embodiment, the "ripple amount" is an adjustment amount calculated based on the adjustment amount Ad of the specific grid point SP, and means an adjustment amount distributed to the peripheral grid points. When the adjustment amount Ad is applied only to the specific grid point SP, the relationship between the output value of the specific grid point SP and the output value of the peripheral grid points existing in the vicinity of the specific grid point SP is broken, and the gradation does not change smoothly. Therefore, in the present embodiment, the adjustment amount (ripple amount) distributed to the peripheral grid point is calculated based on the adjustment amount Ad, and the calculated ripple amount is applied to the peripheral grid point. Hereinafter, a detailed processing procedure will be described with reference to FIG. 8.

Figure 8:
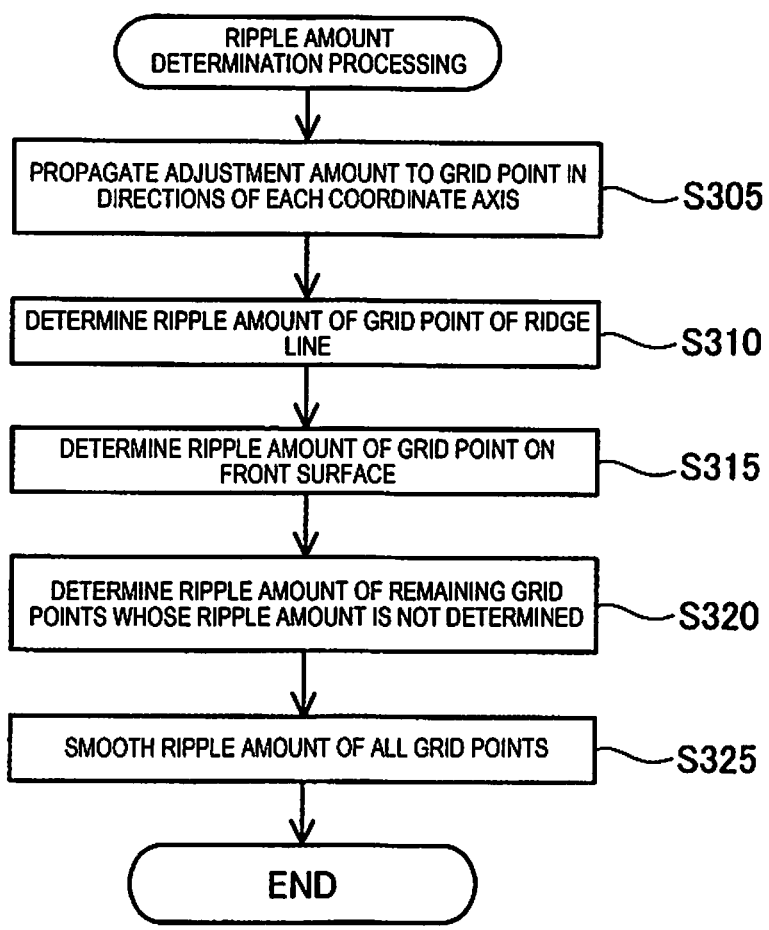
FIG. 8 is a flowchart illustrating a processing procedure of ripple amount determination processing.

FIG. 8 is a flowchart illustrating a processing procedure of ripple amount determination processing. In Step S305, the ripple amount determination unit 14 propagates the adjustment amount Ad to the grid points in the directions of each coordinate axis. The propagation of the adjustment amount Ad in the coordinate axis direction is performed in two stages. First, in the primary propagation, the adjustment amount Ad is propagated from the specific grid point SP in the directions of each coordinate axis. Next, in the secondary propagation, as a result of the primary propagation, the adjustment amount is propagated in the directions of each coordinate axis from the grid point to which the adjustment amount is applied. This will be specifically described below.

Figure 9:
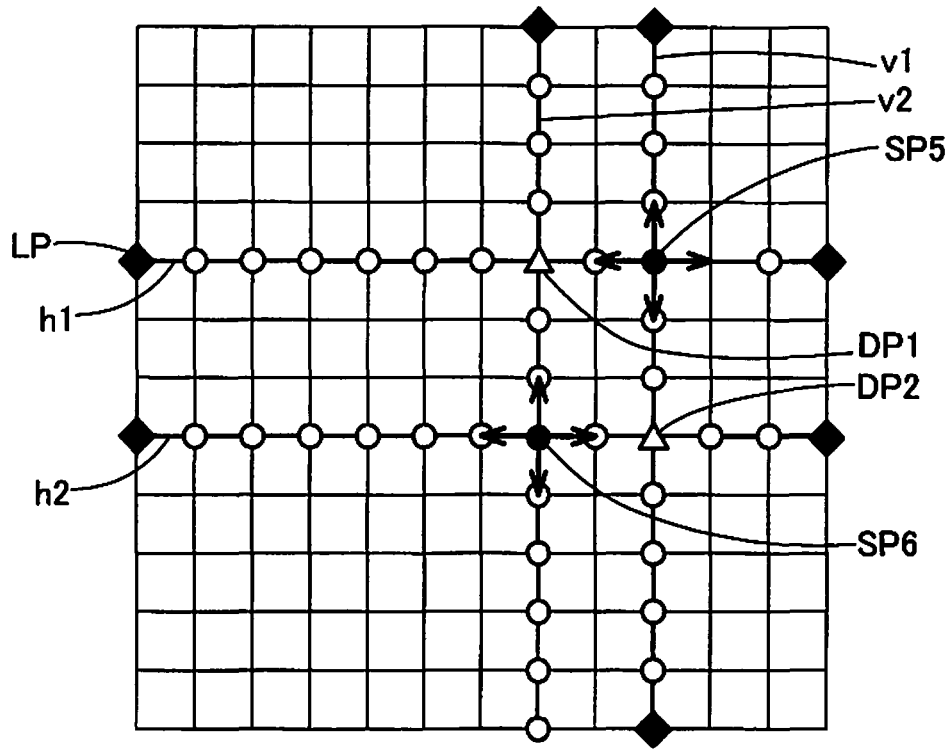
FIG. 9 is an explanatory diagram schematically illustrating an aspect of propagation of the adjustment amount to the grid points in the directions of each coordinate axis.

FIG. 9 is an explanatory diagram schematically illustrating an aspect of propagation of the adjustment amount to the grid points in the directions of each coordinate axis. In FIG. 9, similarly to in FIG. 6, the input color system color space CSp is illustrated in two dimensions. In the example illustrated in FIG. 9, the coordinate axes that primarily and secondarily propagate from a specific grid point SP5 are a coordinate axis h1 and a coordinate axis v1, and the coordinate axes that primarily and secondarily propagate from a specific grid point SP6 are a coordinate axis h2 and a coordinate axis v2. It is assumed that the adjustment amount Ad is calculated for each of the specific grid points SP5 and SP6 according to the above-described procedure.

In the primary propagation, first, ripple provisional adjustment amounts $Ad_j$ of the grid points in the directions of each coordinate axes h1, h2, v1, and v2 from the specific grid points SP5 and SP6 are determined. The j is a number indicating the distance from the specific grid points SP5 and SP6. Specifically, the ripple provisional adjustment amount $Ad_j$ is calculated by linear interpolation between the adjustment amount Ad of the specific grid point SP and the adjustment amount of the grid point on which the adjustment amount is determined on each coordinate axis (end point on the coordinate axis when there is no other). Adjustment amounts are already set for the end points on the coordinate axes (leftmost end or rightmost end of the coordinate axes h1 and h2 and uppermost end or lowest end of the coordinate axes v1 and v2). That is, the adjustment amount of each grid point on the coordinate axes h1 and v1 (in FIG. 9, white circle grid points and white blank triangle grid point on the coordinate axes h1 and v1) is calculated based on the adjustment amount Ad of the specific grid point SP5. The adjustment amount of each grid point on the coordinate axes h2 and v2 (in FIG. 9, white circle grid points and white blank triangle grid point on the coordinate axes h2 and v2) is calculated based on the adjustment amount Ad of the specific grid point SP6. The ripple provisional adjustment amount $Ad_j$ may be calculated by nonlinear interpolation instead of linear interpolation.

Here, as indicated by white blank triangles in FIG. 9, a grid point DP1 on the coordinate axes h1 and v2 and a grid point DP2 on the coordinate axes h2 and v1 are respectively applied with a ripple provisional adjustment amount $Ad_{SP5}$ calculated based on the specific grid point SP5 and a ripple provisional adjustment amount $Ad_{SP6}$ calculated based on the specific grid point SP6, and both adjustment amounts interfere with each other. Therefore, the relationship between the output values of the grid points DP1 and DP2 and the grid points excluding the grid points DP1 and DP2 on the coordinate axes h1, h2, v1, and v2 may be disrupted, and the gradation may not change smoothly. Therefore, as a result of spreading the adjustment amount Ad from the specific grid points SP5 and SP6 in the directions of each coordinate axis h1, h2, v1, and v2, the ripple amount determination unit 14 searches for the grid points DP1 and DP2 to which the adjustment amounts are applied from a plurality of grid points for which the adjustment amounts is determined, and calculates the adjustment amounts to be applied to the grid points DP1 and DP2 by the following procedure.

Specifically, the ripple amount determination unit 14 averages the ripple provisional adjustment amount $Ad_{SP5}$ and the ripple provisional adjustment amount $Ad_{SP6}$ obtained by the above procedure with respect to the grid point DP1 by a weighted average using a reciprocal of the distance between grid point DP1 and specific grid point SP5 and a reciprocal of the distance between grid point DP2 and specific grid point SP5 as weights. That is, averaging is performed so that the influence of the ripple provisional adjustment amount having a longer distance is relatively small. The final adjustment amount at the grid points DP1 and DP2 is determined as an adjustment amount averaged by a weighted average. After the primary propagation is completed, all the ripple provisional adjustment amounts applied to the white circle grid points illustrated in FIG. 9 are discarded. In the secondary propagation described later, this is because the ripple amount is calculated again using four grid points of specific grid points SP5 and SP6 and grid points DP1 and DP2 as grid points for which the adjustment amounts is determined.

In the secondary propagation, the ripple amount determination unit 14 propagates the adjustment amount in the directions of each coordinate axis from the grid point holding the adjustment amount after the primary propagation is completed. In the example illustrated in FIG. 9, the adjustment amount of each grid point (white grid point) on each coordinate axis h1, h2, v1, and v2 is determined based on the specific grid points SP5 and SP6 and the grid points DP1 and DP2. For example, the adjustment amount of the grid point existing between the specific grid point SP5 and the grid point DP1 is calculated by linear interpolation between the adjustment amount set at the specific grid point SP5 and the adjustment amount set at the grid point DP1. The adjustment amount of the grid point existing between the grid point DP1 and the leftmost grid point LP on the coordinate axis h1 is calculated by linear interpolation between the adjustment amount set at the grid point DP1 and the adjustment amount set at the leftmost grid point LP. In the present embodiment, the adjustment amount set at the leftmost grid point LP is set to be zero. In addition, the adjustment amount of each white circle grid point illustrated in FIG. 9 is calculated by the same procedure.

By the primary propagation and the secondary propagation described above, the propagation of the adjustment amount to the grid point in the directions of each coordinate axis is completed. Next, as illustrated in FIG. 8, in Step S310, the ripple amount determination unit 14 determines the ripple amount of the grid point of the ridge line. Specifically, first, the ripple amount determination unit 14 determines the ripple amount of the vertex among the grid points of the ridgeline. When the adjustment amount of the vertex is already determined before the execution of Step S310, the determined adjustment amount is used as the ripple amount of the vertex. On the other hand, when the adjustment amount of the vertex is not determined before the execution of Step S310, zero is used as the ripple amount of the vertex.

Next, the ripple amount determination unit 14 determines the ripple amount of the grid points on the ridge line excluding the vertices by the same procedure as the procedure of calculating the adjustment amount of the grid points DP1 and DP2. That is, the ripple amount determination unit 14 performs linear interpolation with the vertex as an end point, calculates the distance between each grid point where the adjustment amount is not determined on the ridge line and the vertex, and calculates the ripple amount of the grid points on the ridge line by a weighted average weighted by the reciprocal of the calculated distance.

Next, in Step S315, the ripple amount determination unit 14 determines the ripple amount of the grid point on the front surface. The ripple amount of the grid point on the front surface can be calculated by the same procedure as the ripple amount of the grid point of the ridge line described above. That is, the ripple amount determination unit 14 performs linear interpolation with the grid point of the ridge line as an end point, calculates the distance between each grid point where the adjustment amount is not determined on the front surface and the grid point of the ridge line, and calculates the ripple amount of the grid points on the front surface by a weighted average weighted by the reciprocal of the calculated distance.

Figure 10:
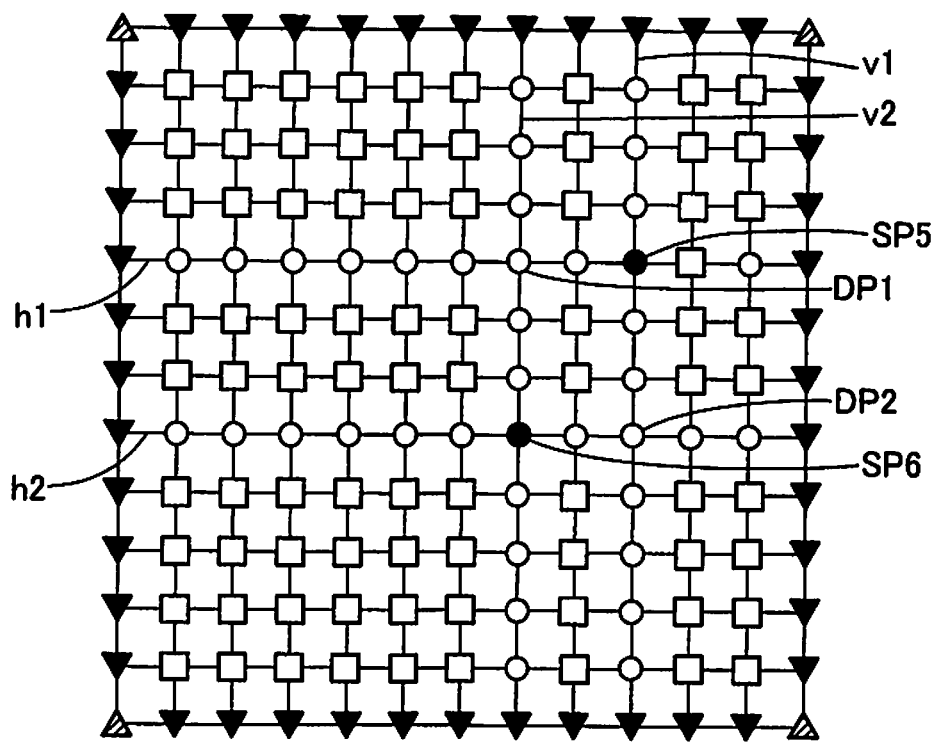
FIG. 10 is an explanatory diagram schematically illustrating an input color system color space after Step S315 is completed.

FIG. 10 is an explanatory diagram schematically illustrating the input color system color space CSp after Step S315 is completed. In FIG. 10, similarly to in FIG. 9, the input color system color space CSp is illustrated in two dimensions. As illustrated by the black circle grid points in FIG. 10, first, in Step S215, the adjustment amounts Ad of the specific grid points SP5 and SP6 are determined. Next, as illustrated by the white circle grid points, in Step S305, the adjustment amounts Ad of the specific grid points SP5 and SP6 are propagated in the directions of each coordinate axis h1, h2, v1 and v2 of the specific grid points SP5 and SP6, and the adjustment amounts of the grid points on the coordinate axes h1, h2, v1, and v2 are determined. As indicated by the hatched triangular grid points, in Step S310, first, the adjustment amount of the grid points of the vertex is determined, and then, the adjustment amount of the grid points of the ridge line is determined as indicated by the black triangular grid points. Thereafter, as illustrated by the square grid points, in Step S315, the adjustment amount of the grid point of the front surface is determined.

As illustrated in FIG. 8, in Step S320, the ripple amount determination unit 14 determines the ripple amount of the remaining grid points whose ripple amount is not determined. In Step S320, the ripple amount determination unit 14 sets the adjustment amount of the grid point whose adjustment amount is not determined among all the grid points existing in the input color system color space CSp. The description of "grid point whose adjustment amount is not i determined" means all grid points whose adjustment amount is not determined in the processing up to Step S315 described above. The grid points of the ridge line, the grid points of the front surface, and the grid points existing inside the input color system color space CSp and having the determined adjustment amount are not included.

In Step S320, the ripple amount determination unit 14 performs linear interpolation with respect to all the remaining grid points in the input color system color space CSp with the grid points of the front surface as end points, and calculates the adjustment amounts in the directions of each coordinate axis. Next, the ripple amount determination unit 14 obtains the distance between the grid point whose adjustment amount is not determined and the grid point on the front surface, based on the calculated adjustment amount in the directions of each coordinate axis, averages the weighted average weighted by the reciprocal of the distance, and determines the obtained value as the adjustment amount. That is, since there are four coordinate axes for one grid point in the input color system color space CSp, after obtaining the adjustment amount in the directions of each coordinate axis, the adjustment amount propagating to one grip point is calculated by synthesizing the adjustment amount for each coordinate axis.

Next, in Step S325, the ripple amount determination unit 14 smooths the ripple amount of all grid points. As described above, the adjustment amount is determined by the interpolation calculation for all grid points of the input color system color space CSp before the execution of Step S325. If the adjustment amount is determined only by the interpolation calculation, the connection between the adjustment amounts may not be a smooth change when overviewing the input color system color space CSp. Therefore, in Step S325, smoothing processing using a filter is executed to adjust the ripple amount of all grid points. In this embodiment, the filter size is 3 grids for each coordinate axis, $3^4$ smoothing filters are applied, and all the grid points in the input color system color space CSp are targeted.

In the ripple amount determination processing described above, the adjustment amount of each grid point in the input color system color space CSp is determined so as to decrease as the distance from the adjustment point AP1 increases. Therefore, the adjustment amount is zero at a gamut outline point that is an outermost end point in the input color system color space CSp.

After Step S325 ends, Step S225 illustrated in FIG. 5 is executed. As illustrated in FIG. 5, in Step S225, the application unit 15 applies the ripple amount to the color conversion table 23. Specifically, the application unit 15 adds each ripple amount determined in the ripple amount determination processing to the output value of each grid point in the color conversion table 23.

Next, in Step S230, the color conversion table adjustment unit 12 calculates a difference between the color value of the color chart and the output value of the color conversion table 23 to which the ripple amount is applied. In Step S230, the difference is calculated by the same procedure as in Step S200 described above. Unlike Step S200, the target color conversion table for calculating the difference is the color conversion table 23 to which the ripple amount is applied. In addition, in Step S230, differences are calculated for all adjustment points to be adjusted.

Next, in Step S235, the color conversion table adjustment unit 12 determines whether or not the difference calculated in Step S230 is a predetermined threshold value or less. Specifically, the color conversion table adjustment unit 12 obtains an average value of differences for all adjustment points calculated in Step S230, and compares the average value with a threshold value. In the present embodiment, the "threshold value" is calculated in advance by an experiment, and is set to 1.0, for example. The threshold value is not limited to 1.0, and any other value may be set. When "YES" is determined in the Step S235, the color conversion table adjustment processing is ended after exiting the loop from Step S210s to Step S210e.

On the other hand, when "NO" is determined in the above-described Step S235, the above-described Steps S215 to S235 are repeated. At this time, the calculation of the adjustment amount, the determination of the ripple amount, and the application of the ripple amount are executed based on the color conversion table 23 to which the ripple amount is applied in Step S225 described above.

In the present embodiment, Steps S215 to S235 are repeatedly executed for the following reason. When the adjustment point AP1 is located on the grid point of the input color system color space CSp, the output value corresponding to the adjustment point AP1 in the color conversion table 23 can be adjusted to the color value of the color chart or a value close to the color value by executing the processing of Step S215 to Step S235 once.

However, in general, the adjustment point AP1 is not located on the grid point of the input color system color space CSp in many cases. In this case, as described above, the output value corresponding to the adjustment point AP1 in the color conversion table 23 is adjusted by applying the adjustment amount obtained by the interpolation calculation to the peripheral grid points. As in this embodiment, by repeating each processing of the calculation of the adjustment amount, the calculation of the ripple amount, and the application of the ripple amount a predetermined number of times, the output value corresponding to the adjustment point AP1 in the color conversion table 23 can be adjusted so as to be the color value of the color chart, which is the target output value, or a value close to the color value, compared to a configuration in which each processing of the adjustment amount calculation, the ripple amount calculation, and the ripple amount application is executed once. Therefore, the accuracy of the color conversion table 23 can be further improved.

According to the color conversion table creation system 500 of the present embodiment described above, the color conversion table creation unit 11 creates the reference color conversion table 24 using the color value of the color chart, and the color conversion table adjustment unit 12 adjusts the color conversion table 23 by adjusting the output value of the specific grid point SP corresponding to the predetermined input value in the created reference color conversion table 24. Here, the color conversion table adjustment unit 12 includes the adjustment amount calculation unit 13 that calculates the adjustment amount Ad of the output value of the specific grid point SP, the ripple amount determination unit 14 that determines the ripple amount when the calculated adjustment amount propagates with respect to the peripheral grid points existing in the vicinity of the specific grid point SP, and the application unit 15 that applies the calculated ripple amount to the peripheral grid point in the color conversion table 23. Therefore, in the color conversion table 23, the output values of the specific grid point SP and the peripheral grid point can be appropriately adjusted, and the accuracy of the color conversion table 23 can be improved.

In addition, the color conversion table adjustment unit 12 repeats the calculation of the adjustment amount, the determination of the ripple amount, and the application of the ripple amount until a predetermined condition is satisfied. Therefore, the color conversion table 23 can be adjusted without requiring new processing different from the calculation of the adjustment amount, the determination of the ripple amount, and the application of the ripple amount. In addition, the predetermined condition is that the difference between the output value corresponding to the predetermined input value in the color conversion table 23 to which the ripple amount is applied and the color value of the color chart is a predetermined threshold value or less. Therefore, it is possible to easily determine whether or not to repeat the calculation of the adjustment amount, the determination of the ripple amount, and the application of the ripple amount.

In addition, when creating the reference color conversion table 24, in a case in which the predetermined input value does not correspond to the grid point of the input color system color space CSp, the color conversion table creation unit 11 creates the reference color conversion table 24 using the color value obtained by performing the interpolation calculation using the color value of the color chart. Therefore, it is not necessary to define a predetermined input value in the color chart, and an increase in the data amount of the color chart data 22 can be suppressed. In addition, the specific grid points SP are grid points SP1 to SP4 that are closest to the predetermined input value among a plurality of grid points surrounding the predetermined input value in the input color system color space CSp. Therefore, in the input color system color space CSp, the specific grid point SP can be easily specified by obtaining the distance between the input value and the plurality of grid points surrounding the input value.

In addition, the ripple amount determination unit 14 sets the ripple amount so that the ripple amount attenuates according to the distance between a center point and the specific grid point SP with the adjustment point AP1 as the center point in the input color system color space CSp. Therefore, the influence on the peripheral grid points other than the specific grid point SP due to the adjustment amount of the specific grid point SP can be reduced and a sudden change in gradation can be suppressed as compared with the configuration in which the ripple amount is determined to be the same.

B. Other Embodiments

B1. Other Embodiment 1

In the above embodiment, although the specific grid point SP is the specific grid point of the single adjustment point AP1, when the specific grid point SP corresponds to the specific grid point of the plurality of adjustment points, the adjustment amount Ad of the specific grid point may be calculated by the following procedure.

Figure 11:
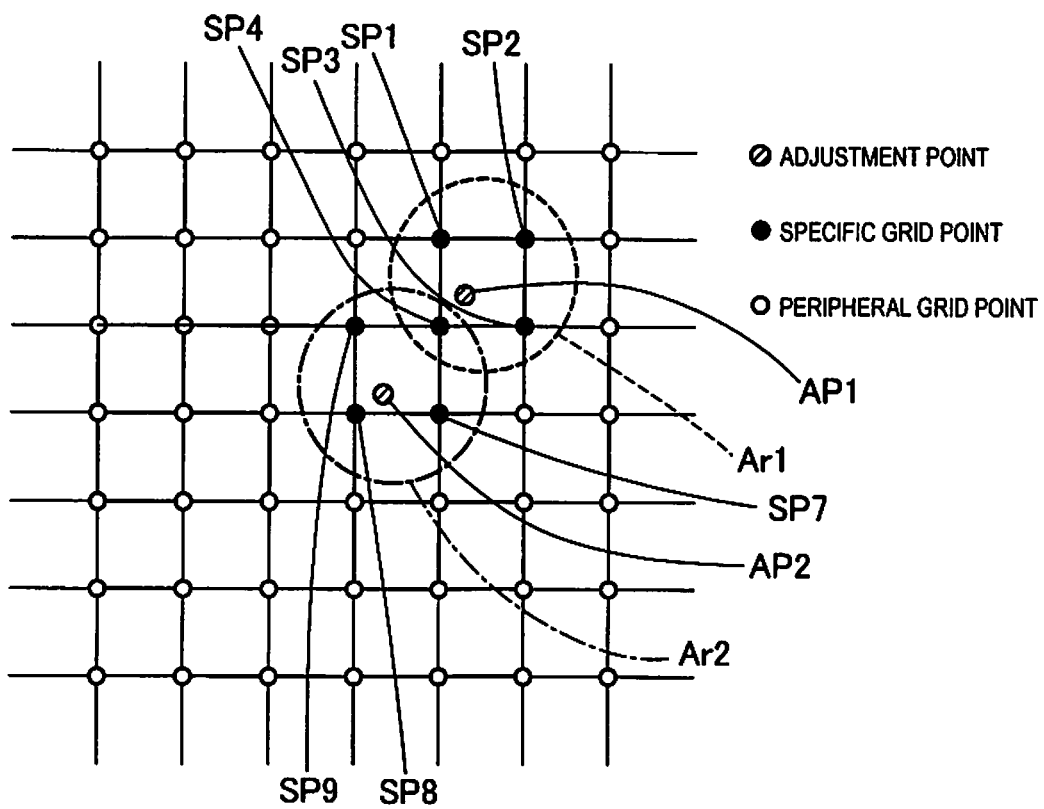
FIG. 11 is an explanatory diagram illustrating an example in which the specific grid points correspond to specific grid points of a plurality of adjustment points.

FIG. 11 is an explanatory diagram illustrating an example in which the specific grid points correspond to specific grid points of a plurality of adjustment points. In FIG. 11, the specific grid points of an adjustment point AP1 are grid points SP1, SP2, SP3 and SP4. The specific grid points of an adjustment point AP2 are grid points SP4, SP7, SP8, and SP9. In FIG. 11, an area Ar1 surrounding the specific grid points SP1, SP2, SP3 and SP4 of the adjustment point AP1 is indicated by a broken line, and an area Ar2 surrounding the specific grid points SP4, SP7, SP8 and SP9 of the adjustment point AP2 is indicated by a one-dot chain line.

The specific grid point SP4 is overlapped and exists in the two areas Ar1 and Ar2. Therefore, the adjustment amount Ad of a first adjustment point AP1 and the adjustment amount Ad of a second adjustment point AP2 are both distributed to the specific grid point SP4. Therefore, the adjustment amount of the specific grid point SP4 is the sum of the adjustment amount Ad of the first adjustment point AP1 and the adjustment amount Ad of the second adjustment point AP2. Specifically, first, the calculation of each adjustment amount Ad of the specific grid points SP1 to SP4 and the propagation of the adjustment amount to the peripheral grid points are performed for the area Ar1. Next, the calculation of each adjustment amounts Ad of the specific grid points SP4, SP7 to SP9 and the propagation of the adjustment amount to the peripheral grid points are performed for the area Ar2.

That is, the adjustment amount of the grid point SP4, which is a specific grid point of the two adjustment points AP1 and AP2, can be calculated using the following formula (2).

$$Ad = \Delta Lab_i \times W_i + \Delta Lab_k \times W_k \quad (2)$$

In the above formula (2), i=1 to 4 and k=4, 7 to 9. W is a weight value, and can be calculated from the Rate in the above-described formula (1).

As described above, even when the specific grid point SP4 is overlapped and corresponds to the specific grid points of the two adjustment points AP1 and AP2, the adjustment amount Ad can be calculated according to the distance between each adjustment point AP1 and AP2 and the specific grid point SP4. In addition, the number of adjustment points at which the specific grid points SP overlap is not limited to the two cases described above, and may be three or more. Even in such a configuration, the same effects as those of the above-described embodiment can be obtained.

In addition, in the example illustrated in FIG. 11, since a range in which each of the adjustment amounts Ad of each of the adjustment points AP1 and AP2 is propagated is determined in advance, whether or not the specific grid point SP4 is overlapped and corresponds to the specific grid point of the two adjustment points AP1 and AP2 may be determined, for example, by determining whether or not the distance from each of the adjustment points AP1 and AP2 to the specific grid point SP4 is within a predetermined radius. That is, it is determined whether or not the specific grid points of other adjustment points are included in the adjustment areas Ar1 and Ar2 defined for each of the adjustment points AP1 and AP2. Therefore, it is possible to specify whether or not the specific grid points are overlapped and exist in the adjustment area of the plurality of adjustment points.

B2. Other Embodiment 2

In each of the embodiments described above, whether or not to repeatedly perform each processing of the calculation of the adjustment amount, the calculation of the ripple amount, and the application of the ripple amount (Steps S215 to S235) is determined by comparing an average value of differences calculated for all adjustment points in the color conversion table 23 with a predetermined threshold value, and the present disclosure is not limited thereto. For example, instead of the average difference value, the maximum difference value may be used.

Specifically, Steps S215 to S235 are repeatedly performed a predetermined number of times. At this time, in Step S230, the difference between the output value of the color conversion table 23 and the color value of the color chart is calculated for all grid points of the color conversion table 23, and the maximum value is obtained from each calculated difference. Next, in repeatedly performing of Step S230, the latest maximum values for the past three times are set to M1, M2, and M3 in order from the newest, and in Step S235, it is determined whether or not the maximum values M1, M2, and M3 for three times satisfy M1>M2>M3. For example, when the maximum values M1, M2, and M3 for three times satisfy M1>M2>M3, "YES" may be determined in Step S235, and the repetition of each processing in Steps S215 to S235 may be ended. In addition, when the maximum values M1, M2, and M3 for three times do not satisfy M1>M2>M3, "NO" is determined in Step S235, and each processing in Steps S215 to S235 may be further repeated.

In the present embodiment, it is possible to determine whether or not the maximum value of the difference continues to increase as a result of calculating and applying the adjustment amount by using the maximum value of the last three previous differences. The description that the maximum value continues to increase means that the maximum value diverges. Therefore, it is preferable that the final state of the color conversion table 23 as a result of calculating and applying the adjustment amount is a state before the maximum value diverges. Therefore, among the color conversion tables 23 to which the last three previous adjustment amounts is applied, the color conversion table 23 three times before, that is, at the time when the maximum value M3 is calculated may be adopted as the final color conversion table. Even in such a configuration, the same effects as those of the above embodiments can be obtained.

B3. Other Embodiment 3

In Other Embodiment 2 described above, in addition to the maximum value of the difference, a dispersion value of the difference may be used. Specifically, in Step S230, the difference for all the adjustment points is calculated in the same procedure as in other embodiment 2 described above, and the maximum value and the dispersion value are obtained from each difference. Next, M1, M2 and M3 are set as the maximum values for the last three previous times in order from newest, and D1, D2 and D3 are set as the dispersion values for the last three previous times in order from newest. In Step S235, it is determined whether or not the maximum values M1, M2, and M3 for three times satisfy M1>M2>M3, and whether or not the dispersion values D1, D2, and D3 for three times satisfy D1>D2>D3.

For example, when the maximum values M1, M2, and M3 for three times satisfy M1>M2>M3, and the dispersion values D1, D2, and D3 for three times satisfy D1>D2>D3, in Step S235, it may be determined as "YES", and the repetition of each processing from Step S215 to Step S235 may be ended. In addition, when the maximum values M1, M2, and M3 for three times do not satisfy M1>M2>M3, or when the dispersion values D1, D2, and D3 for three times do not satisfy D1>D2>D3, in Step S235, it may be determined as "NO", and the processing of Step S215 to Step S235 may be further repeated.

In the present embodiment, by using the dispersion value in addition to the maximum value of the difference, it can be determined whether the tendency of the divergence of the maximum value is local or overall in the input color system color space CSp. Therefore, even when the maximum value diverges in a local range in the input color system color space CSp, priority can be applied to improving the accuracy of the entire input color system color space CSp. Similar to Other Embodiment 2 described above, among the color conversion tables 23 to which the last three previous adjustment amounts are applied, the color conversion table 23 three times before, that is, at the time when the maximum value M3 and the dispersion value D3 are calculated may be adopted as the final color conversion table. Even in such a configuration, the same effects as those of the above embodiments can be obtained.

B4. Other Embodiment 4

In each of the embodiments described above, the ripple amount determination unit 14 determines the ripple amount so that the ripple amount attenuates according to the distance between the peripheral grid point and the specific grid point SP, and it may not be necessarily reduced. For example, the ripple amount may be determined so that the ripple amount increases locally. That is, in general, any configuration may be used as long as the ripple amount is determined so that the ripple amount changes according to the distance between the specific grid point SP and the peripheral grid points. Even in such a configuration; the same effects as those of the above embodiments can be obtained.

B5. Other Embodiment 5

In each of the embodiments described above, the conditions of repeatedly performing each processing (Steps S215 to S225) of the calculation of the adjustment amount, the calculation of the ripple amount, and the application of the ripple amount are that the difference between the output value corresponding to the predetermined input value in the color conversion table 23 to which the ripple amount is applied and the color value of the color chart is a predetermined threshold value or less, or the number of times each processing is repeated is a predetermined number or more, and the present disclosure is not limited thereto. For example, the conditions of the above embodiment and Other Embodiments 2 and 3 may be combined. In addition, for example, until the output value corresponding to the predetermined input value in the color conversion table 23 to which the ripple amount is applied converges to the predetermined value, each processing of the calculation of the adjustment amount, the calculation of the ripple amount, and the application of the ripple amount may be repeated. Even in such a configuration, the same effects as those of the above embodiments can be obtained.

B6. Other Embodiment 6

In each of the embodiments described above, each processing (Steps S215 to S225) of the calculation of the adjustment amount, the calculation of the ripple amount, and the application of the ripple amount is repeatedly performed, and these processing may not be repeated. Even in such a configuration, the same effects as those of the above embodiments can be obtained.

B7. Other Embodiment 7

In each of the embodiments described above, the adjustment amount is propagated to all grid points of the input color system color space CSp, and the present disclosure is not limited thereto. For example, the adjustment amount may be propagated only from the adjustment point AP1 to the grid points existing in the sphere having a predetermined radius in the input color system color space CSp. In this case, in the ripple amount determination processing illustrated in FIG. 8, it may be determined whether or not the adjustment amount propagates over the entire input color system color space CSp prior to Step S305. When it is determined that the adjustment amount propagates to the entire input color system color space CSp, Step S305 described above may be performed. When it is determined that the adjustment amount does not propagate to the entire input color system color space CSp, the adjustment amount may be propagated only from the adjustment point AP1 to the grid points existing within a predetermined range. The above-described "predetermined radius" is different for each input color system, and any radius obtained by an experiment or the like is set in advance. Even in such a configuration, the same effects as those of the above embodiments can be obtained.

B8. Other Embodiment 8

In each of the embodiments described above, the color conversion table creation processing is used when adjusting the color conversion table 23 that receives the color value of the CMYK color system and outputs the color value of the Lab color system, and the present disclosure is not limited thereto. For example, it may be used when a color conversion table used in a printing apparatus different from the printing apparatus 200 is newly created. In this case, a color conversion table for the printing apparatus 200 may be created, a color conversion table for the printing apparatus 200 different from the printing apparatus 200 may be created, and the color conversion table for the printing apparatus 200 different from the printing apparatus 200 may be adjusted using the output values of the two created color conversion tables. Even in such a configuration, the same effects as those of the above embodiments can be obtained.

9. Other Embodiment 9

In each of the embodiments described above, the color conversion table 23 is a look-up table that derives the color value of the Lab color system from the color value of the CMYK color system, and the present disclosure is not limited thereto. For example, the color conversion table 23 may be a look-up table that derives the color value of the Lab color system from the color value of the RGB color system, may be a look-up table that derives the color value of the RGB color system from the color value of the Lab color system, and may be a look-up table that derives the color value of the CMYK color system from the color value of the Lab color system. When the look-up table that derives the color value of the CMYK color system from the color value of the Lab color system, a grid point space corresponding to the input color system color space in the above embodiment is Lab, and an adjustment space corresponding to the output value of the grid point in the above embodiment is CMYK. In general, the color conversion table 23 may be a look-up table that defines the correspondence between any device-dependent color system and any device-independent color system, and each input and output device may be any device such as a printing apparatus, a camera, and a scanner. Even in such a configuration, the same effects as those of the above embodiments can be obtained.

B10. Other Embodiment 10

In each of the embodiments described above, although the color chart is expressed by the color value of the CMYK color system, the color chart may be expressed by color value of any other device-dependent color system such as an RGB color system, instead of the CMYK color system. For example, when the color chart is expressed by the RGB color system, since the printing apparatus 200 includes a color conversion table for converting from the RGB color system to the Lab color system, the color chart data 22 can be appropriately printed. Even in such a configuration, the same effects as those of the above embodiments can be obtained.

B11. Other Embodiment 11

In each of the embodiments described above, a portion of the configuration realized by hardware may be replaced by software, and conversely, a portion of the configuration realized by software may be replaced by hardware. In addition, when a portion or all of the functions of the present disclosure are realized by software, the software (computer program) can be provided in a form stored in a computer-readable recording medium. In this disclosure, the "computer-readable recording medium" is not limited to a portable recording medium such as a flexible disk or a CD-ROM, and includes an internal storage device in a computer such as various RAMs and ROMs, or an external storage device fixed to the computer such as a hard disk. That is, the "computer-readable recording medium" has a broad meaning including any recording medium that can fix data instead of temporarily.

The present disclosure is not limited to the above-described embodiments, and can be realized with various configurations without departing from the spirit of the present disclosure. For example, the technical features in the embodiments corresponding to the technical features in each embodiment described in the summary section of the disclosure can be appropriately replaced or combined in order to solve a portion or all of the above-described problems, or in order to achieve a portion or all of the above effects. In addition, when the technical features are not described as essential in this specification, the technical features can be deleted as appropriate.

C. Other Embodiment (1) According to an aspect of the present disclosure, there is provided a color conversion table creation method. The color conversion table creation method includes creating a reference color conversion table using a color value of a color chart, and adjusting a color conversion table by adjusting an output value of a specific grid point corresponding to a predetermined input value in the created reference color conversion table, in which the adjusting the color conversion table includes an adjustment amount calculation step of calculating an adjustment amount of the output value of the specific grid point, a ripple amount determination step of determining a ripple amount when the calculated adjustment amount propagates with respect to a peripheral grid point existing in a vicinity of the specific grid point, and an application step of applying the determined ripple amount to the peripheral grid point in the color conversion table.

According to the color conversion table creation method of this aspect, the method includes the creating the reference color conversion table using the color value of the color chart, and the adjusting the color conversion table by adjusting the output value of the specific grid point corresponding to the predetermined input value in the created reference color conversion table, and the adjusting the color conversion table includes the adjustment amount calculation step of calculating the adjustment amount of the output value of the specific grid point, the ripple amount determination step of determining the ripple amount when the calculated adjustment amount propagates with respect to the peripheral grid point existing in the vicinity of the specific grid point, and the application step of applying the calculated ripple amount to the peripheral grid point in the color conversion table. Therefore, the output value of the specific grid point and the peripheral grid point can be appropriately adjusted, and the accuracy of the color conversion table can be improved.

(2) In the color conversion table creation method according to the above aspect, the adjusting the color conversion table may repeat the adjustment amount calculation step, the ripple amount determination step, and the application step until a predetermined condition is satisfied.

According to the color conversion table creation method of this aspect, the adjusting the color conversion table repeats the adjustment amount calculation step, the ripple amount determination step, and the application step until the predetermined condition is satisfied. Therefore, the color conversion table can be adjusted without requiring new processing different from the adjustment amount calculation step, the ripple amount determination step, and the application step.

(3) In the color conversion table creation method according to the above aspect, the predetermined condition may include that the number of repetitions is a predetermined number of times or more, and that a difference between the output value corresponding to the predetermined input value in the color conversion table to which the ripple amount is applied and the color value of the color chart is a predetermined threshold value or less.

According to the color conversion table creation method of this aspect, the predetermined condition includes that the number of repetitions is the predetermined number of times or more, and that the difference between the output value corresponding to the predetermined input value in the color conversion table to which the ripple amount is applied and the color value of the color chart is the predetermined threshold value or less. Therefore, it can be easily determined whether or not to repeat the adjustment amount calculation step, the ripple amount determination step, and the application step.

(4) In the color conversion table creation method according to the above aspect, the creating the reference color conversion table may include the creating the reference color conversion table using the color value obtained by performing an interpolation calculation using the color value of the color chart, when the predetermined input value does not correspond to a grid point of a color space of an input color system.

According to the color conversion table creation method of this aspect, the creating the reference color conversion table includes the creating the reference color conversion table using the color value obtained by performing the interpolation calculation using the color value of the color chart, when the predetermined input value does not correspond to the grid point of the color space of the input color system. Therefore, it is not necessary to define the predetermined input value in the color chart, and an increase in the data amount of the color chart can be suppressed.

(5) In the color conversion table creation method according to the above aspect, the specific grid point may be a grid point group that is a set of a plurality of grid points surrounding the predetermined input value with a minimum area or a minimum volume, when the reference color conversion table is represented as a color space of an input color system.

According to the color conversion table creation method of this aspect, the specific grid point is the grid point group that is the set of the plurality of grid points surrounding the predetermined input value with the minimum area or the minimum volume, when the reference color conversion table is represented as the color space of the input color system. Therefore, in the color space of the input color system, the specific grid point can be easily specified by obtaining each of the distances between the input value and the plurality of grid point groups surrounding the input value.

(6) In the color conversion table creation method according to the above aspect, the adjustment amount calculation step may calculate the adjustment amount based on a distance between the predetermined input value in the color space and the specific grid point.

According to the color conversion table creation method of this aspect, the adjustment amount calculation step calculates the adjustment amount based on a distance between the predetermined input value in the color space and the specific grid point. Therefore, the adjustment amount can be determined in accordance with the degree of influence on the predetermined input value.

(7) In the color conversion table creation method according to the above aspect, the ripple amount determination step may determine the ripple amount so that the ripple amount changes according to a distance between a center point and the peripheral grid point with the specific grid point as a center point.

According to the color conversion table creation method of this aspect, it is possible to reduce the influence on the peripheral grid point other than the specific grid point due to the adjustment amount of the specific grid point, and to suppress a rapid change in gradation.

(8) In the color conversion table creation method according to the above aspect, the ripple amount determination step may determine the ripple amount of the peripheral grid point where the adjustment amount is overlapped and propagated from a plurality of the specific grid points to a value obtained by a weighted average weighted by a reciprocal of a distance between the peripheral grid point and the grid point from which the adjustment amount is propagated.

According to the color conversion table creation method of this aspect, the ripple amount determination step determines the ripple amount of the peripheral grid point where the adjustment amount is overlapped and propagated from a plurality of the specific grid points to a value obtained by a weighted average weighted by a reciprocal of a distance between the peripheral grid point and the grid point from which the adjustment amount is propagated. Therefore, even when the adjustment amount is propagated from the plurality of specific lattice points, it is possible to suppress a rapid change in gradation.

The present disclosure can be realized in various aspects. For example, the present disclosure can be realized in the aspects of a color conversion table creation apparatus, a color conversion table creation method, a color conversion table creation system, a computer program for realizing the apparatus, the method and the system, a recording medium on which the computer program is recorded, and the like.

What is claimed is:

1. A color conversion table creation method comprising:
    creating a reference color conversion table using a color value of a color chart; and
    adjusting a color conversion table by adjusting an output value of a specific grid point corresponding to a predetermined input value in the created reference color conversion table, wherein
    the adjusting the color conversion table includes
        an adjustment amount calculation step of calculating an adjustment amount of the output value of the specific grid point,
        a ripple amount determination step of determining a ripple amount when the calculated adjustment amount propagates with respect to a peripheral grid point existing in a vicinity of the specific grid point, and
        an application step of applying the determined ripple amount to the peripheral grid point in the color conversion table.

2. The color conversion table creation method according to claim 1, wherein
    the adjusting the color conversion table repeats the adjustment amount calculation step, the ripple amount determination step, and the application step until a predetermined condition is satisfied.

3. The color conversion table creation method according to claim 2, wherein
    the predetermined condition includes
        that the number of repetitions is a predetermined number of times or more, and
        that a difference between the output value corresponding to the predetermined input value in the color conversion table to which the ripple amount is applied and the color value of the color chart is a predetermined threshold value or less.

4. The color conversion table creation method according to claim 1, wherein
    the creating the reference color conversion table includes
        the creating the reference color conversion table using the color value obtained by performing an interpolation calculation using the color value of the color chart, when the predetermined input value does not correspond to a grid point of a color space of an input color system.

5. The color conversion table creation method according to claim 1, wherein
    the specific grid point is a grid point group that is a set of a plurality of grid points surrounding the predetermined input value with a minimum area or a minimum volume, when the reference color conversion table is represented as a color space of an input color system.

6. The color conversion table creation method according to claim 5, wherein
    the adjustment amount calculation step calculates the adjustment amount based on a distance between the predetermined input value in the color space and the specific grid point.

7. The color conversion table creation method according to claim 5, wherein
    the ripple amount determination step determines the ripple amount so that the ripple amount changes according to a distance between a center point and the peripheral grid point with the specific grid point as a center point.

8. The color conversion table creation method according to claim 1, wherein
    the ripple amount determination step determines the ripple amount of the peripheral grid point where the adjustment amount is overlapped and propagated from a plurality of the specific grid points to a value obtained by a weighted average weighted by a reciprocal of a distance between the peripheral grid point and the grid point from which the adjustment amount is propagated.

9. A color conversion table creation apparatus, comprising:
    a color conversion table creation unit that creates a reference color conversion table using a color value of a color chart; and
    a conversion table adjustment unit that adjusts a color conversion table by adjusting an output value of a specific grid point corresponding to a predetermined input value in the created reference color conversion table, wherein
    the conversion table adjustment unit includes
        an adjustment amount calculation unit that calculates an adjustment amount of the output value of the specific grid point,
        a ripple amount determination unit that determines a ripple amount when the calculated adjustment amount propagates with respect to a peripheral grid point existing in a vicinity of the specific grid point, and
        an application unit that applies the determined ripple amount to the peripheral grid point in the color conversion table.

10. A non-transitory computer-readable storage medium storing a computer program for creating a color conversion table, the program causing a computer to realize:
    a function of creating a reference color conversion table using a color value of a color chart; and
    a function of adjusting a color conversion table by adjusting an output value of a specific grid point corresponding to a predetermined input value in the created reference color conversion table, wherein
    the function of adjusting the color conversion table includes a function of calculating an adjustment amount of the output value of the specific grid point, a function of determining a ripple amount when the calculated adjustment amount propagates with respect to a peripheral grid point existing in a vicinity of the specific grid point, and a function of applying the determined ripple amount to the peripheral grid point in the color conversion table.

* * * * *